D. BOOKWALTER.
Corn Husker.
No. 90,230. Patented May 18, 1869.
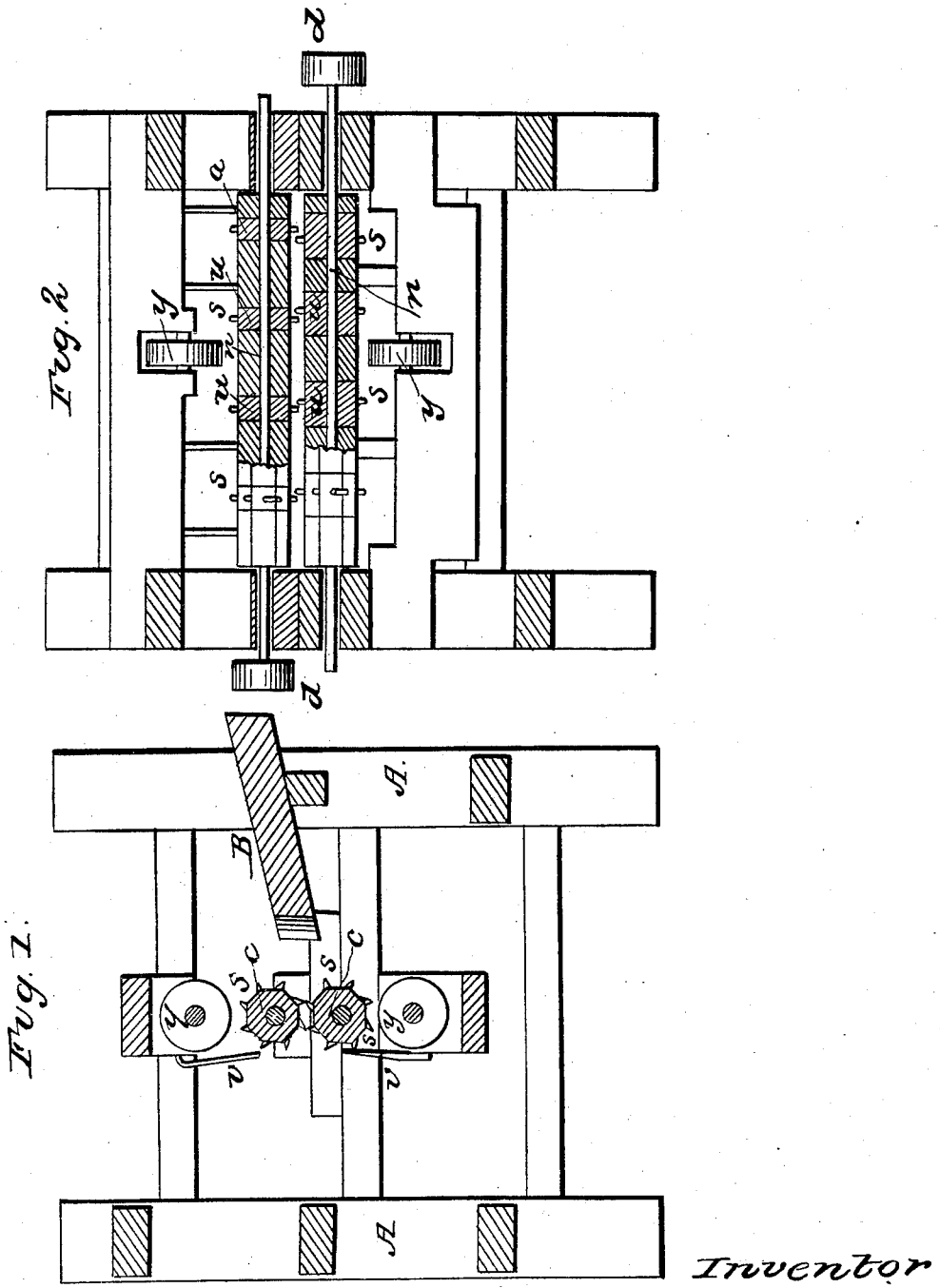

United States Patent Office.

DAVID BOOKWALTER, OF GARDNER, ILLINOIS.

Letters Patent No. 90,230, dated May 18, 1869.

---

IMPROVEMENT IN CORN-HUSKER.

---

The Schedule referred to in these Letters Patent and making part of the same.

---

*To all whom it may concern:*

Be it known that I, DAVID BOOKWALTER, of Gardner, in the county of Grundy, and State of Illinois, have invented a new and valuable Improvement in Corn-Huskers; and I do hereby declare that the following is a full, clear, and exact description of the construction and operation of the same, reference being had to the annexed drawings, making a part of this specification, and to the letters and figures of reference marked thereon.

Figure 1 of the drawings is a side sectional view of my device.

Figure 2 is an end sectional view of the same.

My invention relates to devices for husking corn; and

It consists, mainly, in constructing and arranging a series of small revolving shafts, or cylinders, with spurs on their surfaces, to husk the corn, and wires, or strips of metal adjusted, to prevent the revolving shafts and teeth, or spurs from being clogged by husks and leaves while the husking-process is being carried on.

It also consists in providing novel and efficient means for preventing the husking-rollers from being forced too far apart and broken.

The letter A of the drawings represents a quadrangular frame, with cross-bars, and an apron marked B.

The letters $c$ are husking-rollers, adjusted as shown, and having central bars, respectively, to which series of flanches are united, with rows of spurs, or teeth on their peripheries, as shown.

The central bars are marked $n$, the flanches $u$, and the teeth $s$.

The letters $d$ are belt-drums, attached to the outer ends of the central bars $n$, and by which the husker is actuated.

The letters $v$ are bent wires or strips of metal, adjusted as shown, the office of which is to aid in clearing the revolving shafts from husks and leaves.

The letters $y$ are rollers, adjusted as shown, the office of which is to prevent the husking-rollers from being spread too far apart, or broken by the passage of large ears.

What I claim as my invention, and desire to secure by Letters Patent, is—

A husking-machine, having husking-rollers $c$, with their central shafts, flanches, spurs, and drums, constructed as described, in combination with the rollers $y$ and bent wires $v$, when constructed, arranged, and operating substantially as specified.

In testimony that I claim the above, I have hereunto subscribed my name, in the presence of two witnesses.

DAVID BOOKWALTER.

Witnesses:
ALFRED J. HILL,
SAMUEL A. BOOKWALTER.